United States Patent [19]

Andrews

[11] Patent Number: 4,592,686

[45] Date of Patent: Jun. 3, 1986

[54] FASTENING DEVICE

[76] Inventor: Gary E. Andrews, 5199 Priorybrook Rd., Florissant, Mo. 63033

[21] Appl. No.: 578,773

[22] Filed: Feb. 9, 1984

Related U.S. Application Data

[63] Continuation-in-part of Ser. No. 306,139, Sep. 28, 1981, Pat. No. 4,431,352.

[51] Int. Cl.[4] .............................................. B23B 43/00
[52] U.S. Cl. .......................................... 410/101; 16/2; 248/500; 248/499; 403/164; 410/85
[58] Field of Search ...................... 248/500, 499, 503.1, 248/505, 59; 403/119, 164; 24/115 K; 16/2, DIG. 33; 410/101, 112, 113, 114, 85

[56] References Cited

U.S. PATENT DOCUMENTS

| | | | |
|---|---|---|---|
| 240,380 | 4/1881 | Buck | 403/164 |
| 3,273,946 | 9/1966 | Gerner | 403/119 |
| 3,297,293 | 1/1967 | Andrews et al. | 248/499 |
| 3,504,937 | 4/1970 | Panovic | 403/164 |
| 4,074,519 | 2/1978 | Garret | 248/499 |
| 4,295,765 | 10/1981 | Burke | 410/101 |
| 4,431,352 | 2/1984 | Andrews | 248/499 |

Primary Examiner—Ramon S. Britts
Assistant Examiner—Ramon O. Ramirez
Attorney, Agent, or Firm—Cohn, Powell & Hind

[57] ABSTRACT

This fastening device provides a self-contained, tie-down unit by means of which load from a swivel eye is transferred to a base. The fastening device includes a stud, threadedly connectible to a base and mounting a collar and a bushing member. The bushing member and collar cooperate to provide a swivel mount for the load ring. The bushing member and stud cooperate to transfer variable loadings into the base in a manner predictable from their size and configuration.

5 Claims, 6 Drawing Figures

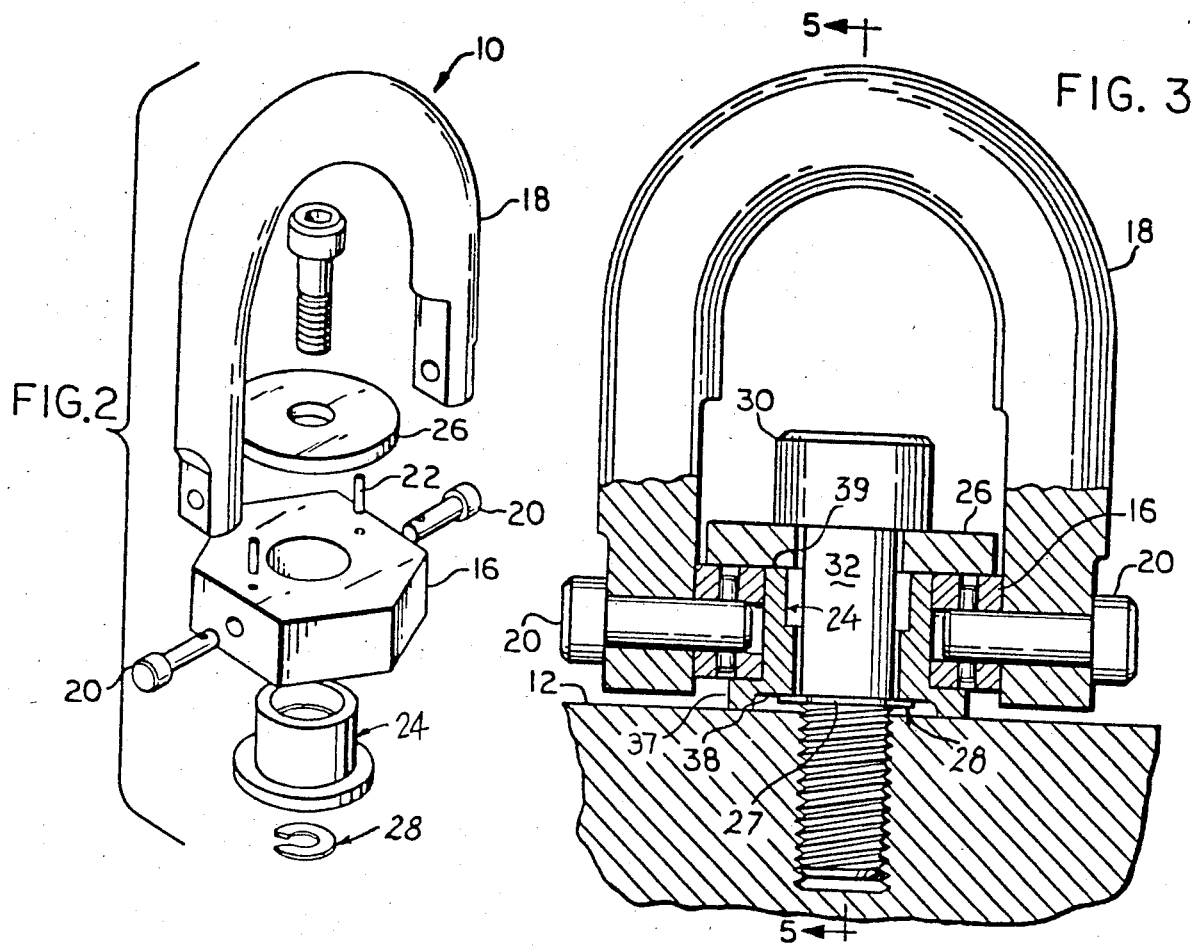
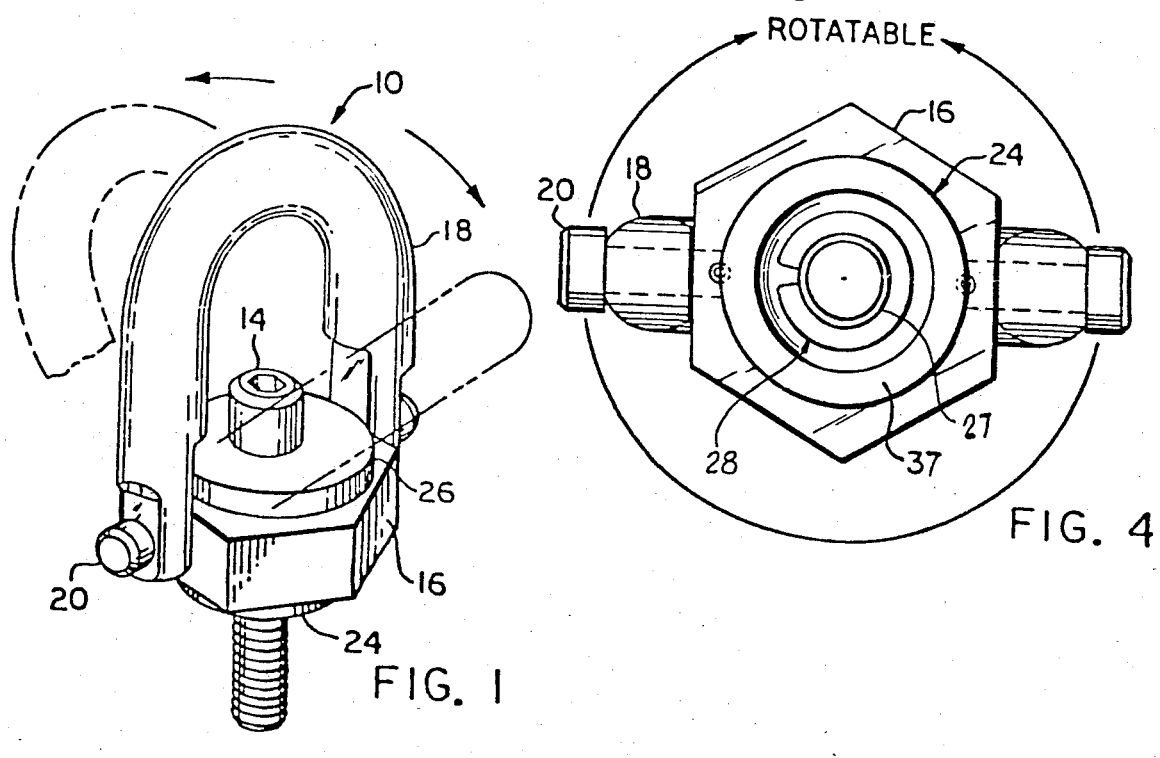

FASTENING DEVICE

RELATED U.S. APPLICATION DATA

Continuation-in-part of Ser. No. 306,139, Sept. 28, 1981, now U.S. Pat. No. 4,431,352.

BACKGROUND OF THE INVENTION

This invention relates generally to a fastening device and more particularly to an improved, swivel tie-down unit.

Tie-down units of the type under consideration are widely used for a variety of purposes such as providing hold-downs for airplanes, trucks and containers for cargo carried by trucks and for providing lifting eyes for engine blocks and similar items.

In particular, the fastening device which forms the subject matter of this invention represents an improvement over U.S. Pat. No. 3,297,293. Although the fastening device disclosed in this patent has proven effective for its intended purposes it has a relatively high load transfer center.

SUMMARY OF THE INVENTION

This fastening device provides a tie-down unit having an improved load distribution system.

The fastening device includes a stud having a head and a shank, the shank having a threaded portion adapted to be fastened to the base; a bushing member including an inner surface having an upper portion spaced from the stud, a lower bearing portion engageable with the stud and an end bearing portion operatively engageable with the base. Load attaching means are provided operatively connected to the bushing member in swivel relation for transferring applied load to the bushing member.

In one aspect of the invention the bushing member bearing portion has a height substantially less than the height of the bushing member.

In another aspect of the invention the stud includes an upper unthreaded portion spaced from the bushing member and a lower unthreaded bearing portion engageable by the bushing lower bearing portion.

In still another aspect of the invention the bushing member inner surface is cylindrical and the upper portion has a diameter greater than the lower portion.

BRIEF DESCRIPTION OF THE DRAWINGS

FIG. 1 is a perspective view of the fastening device;

FIG. 2 is a similar view showing the parts of the device in exploded relation;

FIG. 3 is a side elevational view, partly in cross-section along a vertical plane passed through the stud axis;

FIG. 4 is a bottom plane view of the device;

DESCRIPTION OF THE PREFERRED EMBODIMENT

Figure 5:
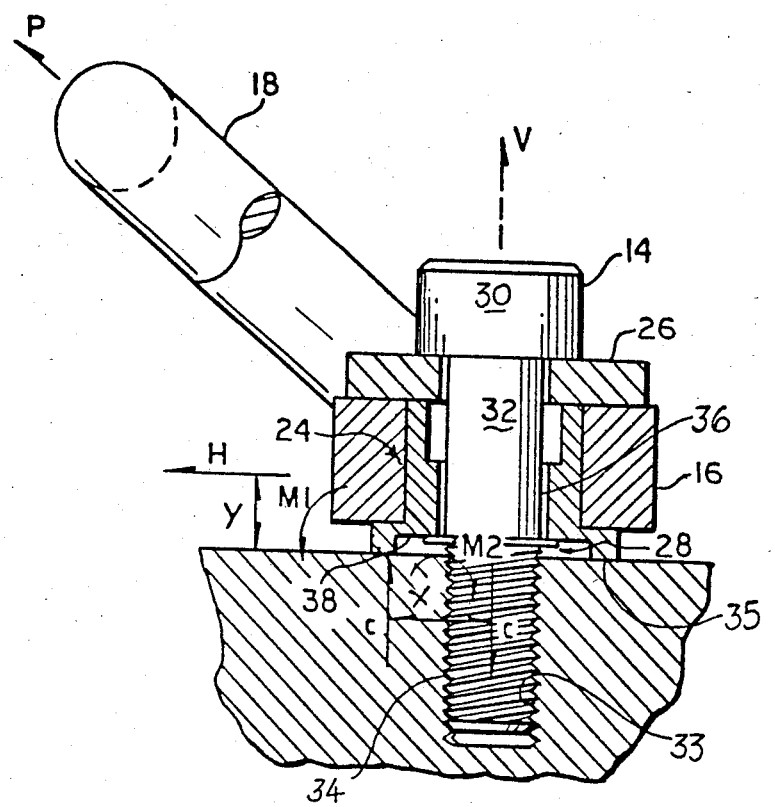
FIG. 5 is a cross-section view taken on line 5—5 of FIG. 3.

Referring now by reference numerals to the drawings and first to FIGS. 1, 2 and 3 it will be understood that the fastening device is generally indicated by numeral 10 and is threadedly attached to a base 12.

The component parts of the device include a stud 14 which is threadedly attached to the base 12 and provides a rotational axis for a load attaching means. As shown, the load attaching means includes a swivel load ring 16 and an eye member 18, said eye member being pivotally mounted to the load ring 16 as by pivot pins 20 held in place by lock pins 22.

Load from the eye member 18 is transferred to the stud 14 by a bushing member 24 and a washer or collar 26 and the component parts of the device are held in assembly prior to installation by a retainer member in the form of a snap ring 28.

Figure 6:
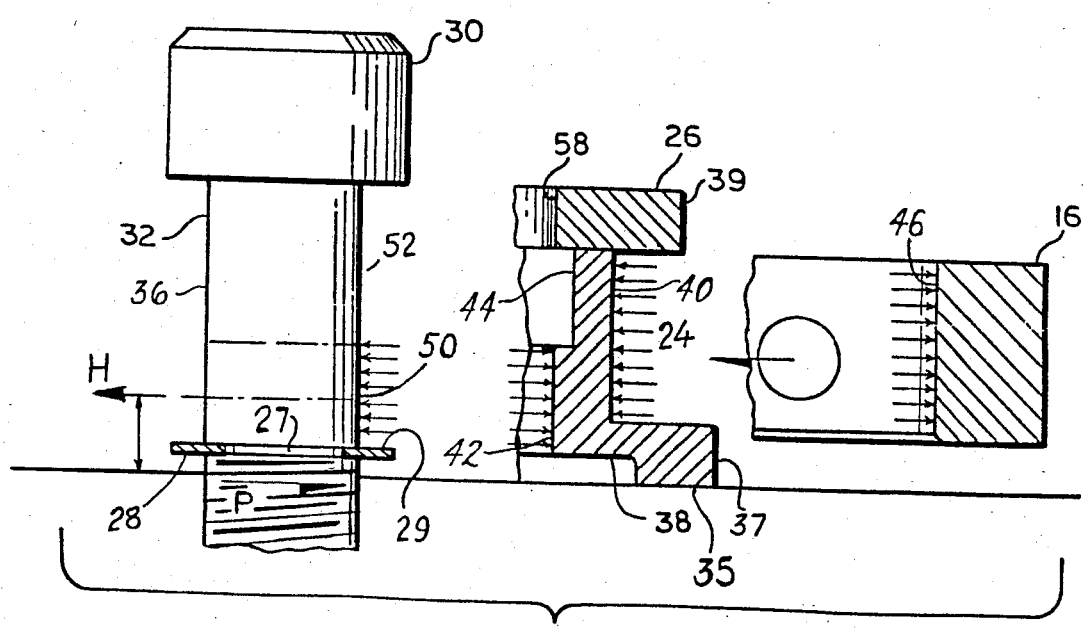
FIG. 6 is a schematic view showing the distribution of forces on the parts of the device.

As best shown by reference to FIGS. 3, 5 and 6 the stud 14 includes an enlarged head 30, which is engageable with the collar 26, and a partially threaded shank 32 received within the base 12 which is typically a metal plate having a ground attaching means. In the embodiment shown, the base 12 is a metal plate having a threaded opening 33 receiving the lower threaded portion 34 of the shank while an upper, adjacent unthreaded portion 36 are disposed above the base 12.

The bushing member 24 is generally cylindrical and includes an annular flange 37 providing a lower end bearing portion 35 engageable with the base 12, a recessed, annular abutment 38 and an upper margin 39 providing an upper end bearing portion engageable by the collar 26. The load ring 16 is of a thickness to be received in clearance relation between the collar 26 and the bushing member 24 in conformance with the line of action of the force P applied to the load ring 16.

As best shown in FIG. 6 the bushing member 24 includes an outer surface providing a cylindrical bearing portion 40 and an inner surface having a lower cylindrical bearing portion 42 and an upper increased diameter cylindrical portion 44. The load ring 16 includes an inner surface having a cylindrical portion 46, which is bearingly engageable with the bearing portion 40 of the bushing member 24.

The stud unthreaded portion 36 provides an outer surface having a lower cylindrical portion 50 engageable with the bushing member lower bearing portion 42, and an upper cylindrical portion 52 spaced from the upper portion 44 of the bushing member 24. The stud 14 includes a groove 27 receiving the snap ring 28 and the snap ring 28 provides an outwardly extending annular bearing face 29 engageable with the abutment face 38 of the bushing member 24.

Because of the above described arrangement of component parts the inner bearing portion 46 of the ring 16 is engageable with the outer bearing portion 40 of the bushing member 24. However, only the lower bearing portion 42 of the bushing 24 is engageable with the lower bearing portion 50 of the stud unthreaded portion. The upper portion 44 of the bushing member 24 is not engageable with the upper portion 52 of the stud shank thereby reducing the elevation of the line of action of the load transferred from the attaching means to the collar 16.

It is thought that the structural features and functional advantages of this fastening device have become fully apparent from the foregoing description of parts but, for completeness of disclosure the operation of the device, and interaction of the components will be briefly described.

As will be readily understood by reference to FIGS. 3, 4 and 5, prior to installation, the stud 14, the load ring 16, the bushing member 24 and the collar 26 are maintained in assembly by virtue of the snap ring 28. As shown in FIGS. 3 and 5, there is a slight lateral clearance between upper portion 52 and the collar opening 58, and the stud lower portion 52 and the bushing member bearing portion 42 in the assembled condition.

With the components assembled as described, the stud 14 can be threadedly connected within the base opening 33 until the collar 26 bears down upon the bushing member 24 and the bushing flange lower end bearing portion 35 bears upon the surface of the base 12. At this point the collar 26 and bushing member 24 are, to all intents and purposes, substantially integrally formed and provide a groove, defined by the collar 24 and bushing flange 37 about which the load ring 16 can freely rotate.

When a load $P$ is applied to the eye member 18 as shown in FIG. 5, component horizontal and vertical forces $H$ and $V$ respectively are transmitted to the stud 14. The vertical force $V$ is carried by the stud 14 and the horizontal force $H$ produces a turning moment $M_1$. The turning moment $M_1$ tends to be resisted by a force couple $M_2$ provided by a tension force on the stud 14 and a bearing force on the bushing flange 37 both of which are equal to $C$.

Stated mathematically, if the turning moment $M_1 = Hy$ and the resistance couple $M_2 = Cx$ then, when the two members are in balance and $M_1 = M_2$, $Hy = Cx$ and $C = Hy/x$. Where:

$H$ = horizontal component of load $P$;
$Y$ = height of the point of application of $H$;
$C$ = resistance force, and
$X$ = force couple arm.

Thus, it can be seen that the force $C$ applied to the flange 37 is a function of the height of force $H$ and also the diameter of the bushing member flange 37.

It is therefore an advantage to reduce $Y$, the height of the line of action of force $H$. The structural arrangement of parts by which this is achieved in the preferred embodiment is best shown in FIG. 6 which is a laterally separated schematic rendering. As shown in FIG. 6, the horizontal component of force from the load ring 16 is transmitted from the load ring inner bearing portion 46 to the stud shank threaded portion 50 through the medium of the bushing member outer and inner bearing portions 40 and 42. There is no corresponding transmission of force between the load ring inner upper portion, the bushing member outer and inner upper portions 40 and 44, and the unthreaded upper portion 52 of the stud.

Because of the above structural relationship of parts, and the consequent lowering of the height of the line of action of the load component force $H$, the bearing load of the base 12 under the bushing member flange 37 is effectively reduced. Further, the snap ring 28, effectively supports the bushing member 24 and hence the assembly as a whole prior to installation.

I claim as my invention:

1. A fastening device for anchoring a load to a threaded base, the fastening device comprising:
    (a) a stud including a head and a shank, said shank having a threaded portion adapted to be fastened to the base, and upper and lower unthreaded portions between the threaded portion and the head,
    (b) a bushing member including an inner surface having an upper portion, and a lower portion at least the lower portion being bearingly engageable with the lower unthreaded portion of the stud, and an end bearing portion operatively engageable with the base, and
    (c) load attaching means operatively connected to the bushing member in swivel relation for transferring applied load to the bushing member.

2. A fastening device as claimed in claim 1, in which:
    (d) the bushing member bearing portion has a height substantially less than the height of the bushing member.

3. A fastening device for anchoring a load to a threaded base, the fastening device comprising:
    (a) a stud including a head and a shank, said shank having a threaded portion adapted to be fastened to the base,
    (b) a bushing member including an inner surface having an upper portion spaced from the stud, a lower bearing portion engageable with the stud, and an end bearing portion operatively engageable with the base,
    (c) load attaching means operatively connected to the bushing member in swivel relation for transferring applied load to the bushing member, and
    (d) the stud including an upper unthreaded portion spaced from the bushing member and a lower unthreaded bearing portion engageable by the bushing member lower bearing portion.

4. A fastening device as defined in claim 1, in which:
    (d) the bushing member inner surface is cylindrical and the upper portion has a diameter greater than the lower bearing portion.

5. A fastening device as defined in claim 1, in which:
    (d) the stud includes a circumferential groove and a snap ring retainer received by the groove and engageable with the bushing, and
    (e) the unthreaded portion of the stud extends at least between the snap ring and the head of the stud.

* * * * *